United States Patent
Green

[11] Patent Number: 6,068,233
[45] Date of Patent: May 30, 2000

[54] COLLAPSIBLE TRAFFIC POST WITH ROTATING DELINEATOR

[76] Inventor: Helen M. Green, 100 Main St., Gilford, Mont. 59525

[21] Appl. No.: 09/084,869

[22] Filed: May 29, 1998

[51] Int. Cl.[7] .............................. F16M 13/00; E01F 9/00; F16D 9/00; F16P 5/00
[52] U.S. Cl. .................. 248/548; 404/10; 403/2
[58] Field of Search ............................. 248/548, 292.12, 248/278.1, 284.1, 900; 40/608, 607, 145; 404/10; 403/2

[56] References Cited

U.S. PATENT DOCUMENTS

| | | | |
|---|---|---|---|
| 446,852 | 2/1891 | Davis | 248/548 |
| 564,454 | 7/1896 | Ryan | 248/284.1 |
| 1,340,273 | 5/1920 | Jones | 248/284.1 |
| 4,032,248 | 6/1977 | Parduhn et al. | 404/10 |
| 4,353,665 | 10/1982 | Green | 404/10 |
| 4,491,438 | 1/1985 | Berutti | 404/10 |
| 4,645,168 | 2/1987 | Beard | 248/548 |
| 5,215,283 | 6/1993 | Gould | 248/548 |
| 5,452,964 | 9/1995 | Trougouboff | 404/10 |
| 5,480,121 | 1/1996 | Rice et al. | 248/548 |
| 5,484,217 | 1/1996 | Carroll et al. | 404/10 |
| 5,551,660 | 9/1996 | Leduchowski | 248/284.1 |
| 5,887,842 | 3/1999 | Granger | 248/548 |

*Primary Examiner*—Leslie A. Braun
*Assistant Examiner*—Jon A Szumny
*Attorney, Agent, or Firm*—D. L. Tschida

[57] ABSTRACT

A multi-section support post for a reflective, roadway delineator that collapses upon impact at a replaceable joint. A ground stake and a sign stake are joined together with hardwood blocks that are separated with a material having a large coefficient of friction. The blocks are secured with a pivot bolt to recessed channels at the stakes. An intervening layer of tarpaper is compressed between the blocks. The sign stake collapses at the joint upon impact, such as from a snowplow. A reflective roadway delineator rotates about a pivot bolt or axle that projects from the sign stake.

16 Claims, 3 Drawing Sheets

COLLAPSIBLE TRAFFIC POST WITH ROTATING DELINEATOR

BACKGROUND OF THE INVENTION

The present invention relates to roadway markers and signs that delineate traffic lanes and/or the edges of public roads and, in particular, to a collapsible signpost and movable reflective marker.

Lane or roadway markers or delineators can be positioned at the center or sides of roadways to alert drivers to the right and left extremes of each traffic lane. Many markers are mounted to signposts secured along the road shoulder or in the center median. The markers generally provide reflective surfaces and many are designed to move to catch a driver's attention and assure recognition. The markers are especially helpful at night or during extreme weather conditions, such as fog, rain or snow. The markers are typically mounted at uniformly spaced distances of several hundred feet, for example, the normal distance illuminated by a vehicle's headlights. A marker is thereby always visible to a driver to delineate at least one road edge. The lack of one or more markers makes driving difficult, since drivers must guess where the road is.

Damage to roadway markers or delineators frequently occur from traffic accidents and maintenance equipment. The problem can be especially onerous in locales that experience snowstorms and icy road conditions. Snow plows, graders and other road maintenance equipment commonly damage the signs and signposts, not to mention residential mailboxes, when maintaining the roads under such conditions.

Delineator signposts are typically constructed from metal channel stock that exhibits a general "U" shape when view end on. These signposts are commonly bent or knocked over with a plow blade or windrow of plowed snow or ice. Most damage occurs from lateral impact to the post, which can shear, bend or twist the post.

With each change of season, if not sooner, maintenance personnel must repair and/or replace the damaged signs and signposts. Because such repairs are labor intensive and time consuming, the repairs can be costly for any municipality or responsible agency.

Repairs may require either replacement of bent or damaged reflective markers and/or replacement of the signpost. Signpost replacement is rather tedious and requires replacing all damaged components and/or extracting the damaged post from the ground. Any digging increases the necessary time and cost of repairs. If the ground is frozen, extraction may not be possible until spring thaw.

The present signpost was developed to reduce necessary repair time and minimize digging. The signpost provides a multi-section post that includes a ground stake and a sign stake that are secured at a collapsible joint. A replaceable friction material is compressed at the joint in a vertical plane that parallels the interface between the stakes to retain the stakes upright. The joint provides a controlled threshold to rotation that retains the sign upright under normal conditions yet fails when the sign stake is stressed with forces greater than a predetermined amount. For example, the sign stake will remain upright under heavy winds, yet collapse if exposed to greater forces less than that necessary to bend the stake.

SUMMARY OF THE INVENTION

It is accordingly a primary object of the invention to provide a collapsible roadway signpost.

It is a further object of the invention to provide a signpost that collapses at a renewable joint upon lateral impact, such as from a snowplow.

It is a further object of the invention to provide a joint between a ground stake and sign stake defined by mating hardwood blocks that mount to channels at the stakes and are separated by a compressible material having a large coefficient of friction.

It is a further object of the invention to provide a rotating, reflective marker that mounts to a collapsible signpost.

Various of the foregoing objects, advantages and distinctions of the invention are obtained in a presently preferred signpost that accepts rotating, reflective markers. The signpost provides a ground stake that is buried into the ground. A sign stake is drawn into compression with the ground stake at a pivot bolt and compressible joint. A replaceable section of material having a large coefficient of friction is fitted between blocks that mate with channels at the posts. The material lies in a plane coincident with opposed faces of the stakes and blocks and retains the stakes upright. When the signpost is subjected to a force sufficient to dislodge and/or overcome the friction exerted between the blocks, the sign post rotates or collapses about the pivot bolt. The signpost is repaired by loosening the joint, replacing the friction material, resetting the stakes in alignment and tightening the pivot bolt.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
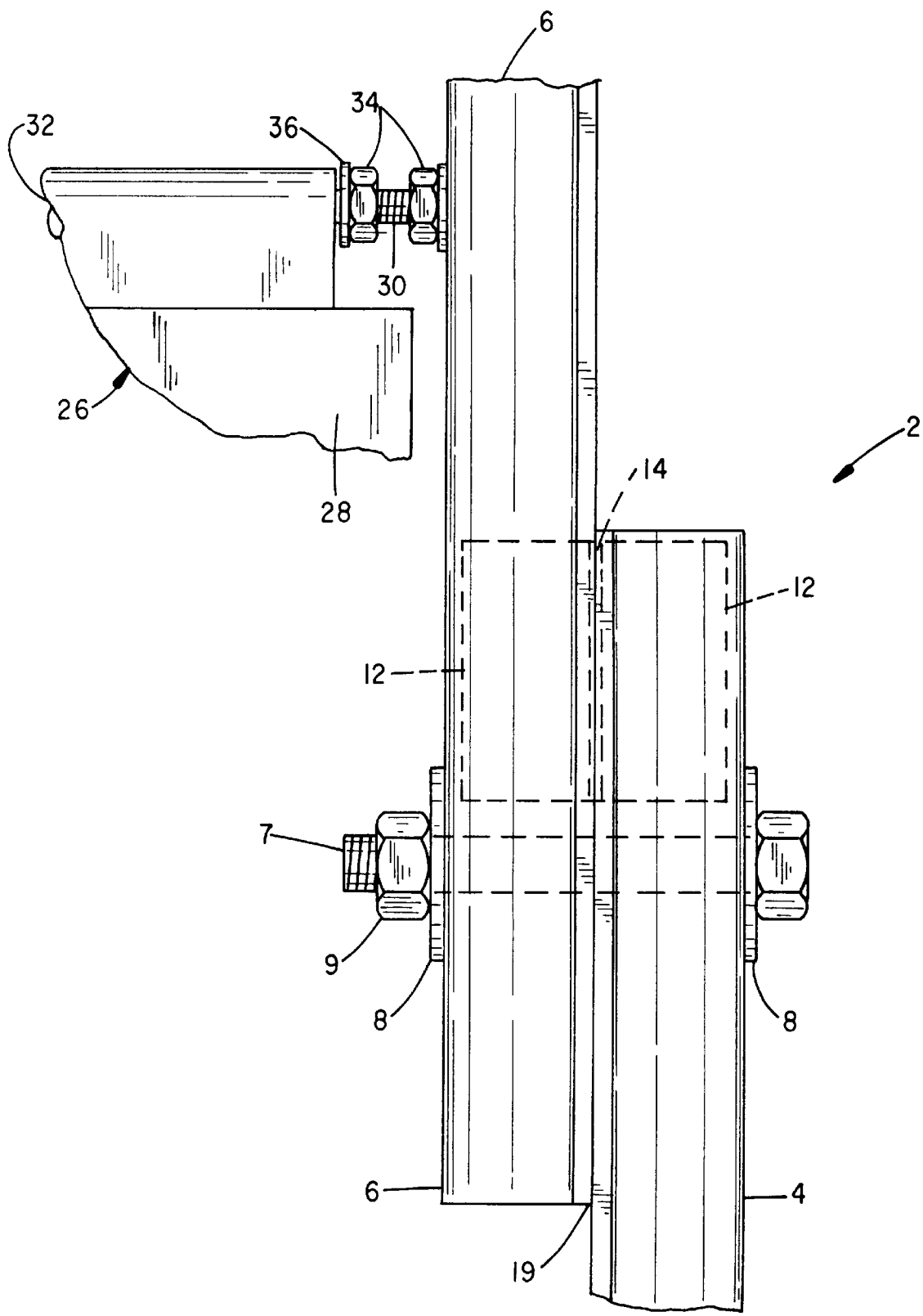
FIG. 1 is a plan view showing a signpost of the invention and wherein a collapsible joint is depicted in dashed line.
Figure 2:
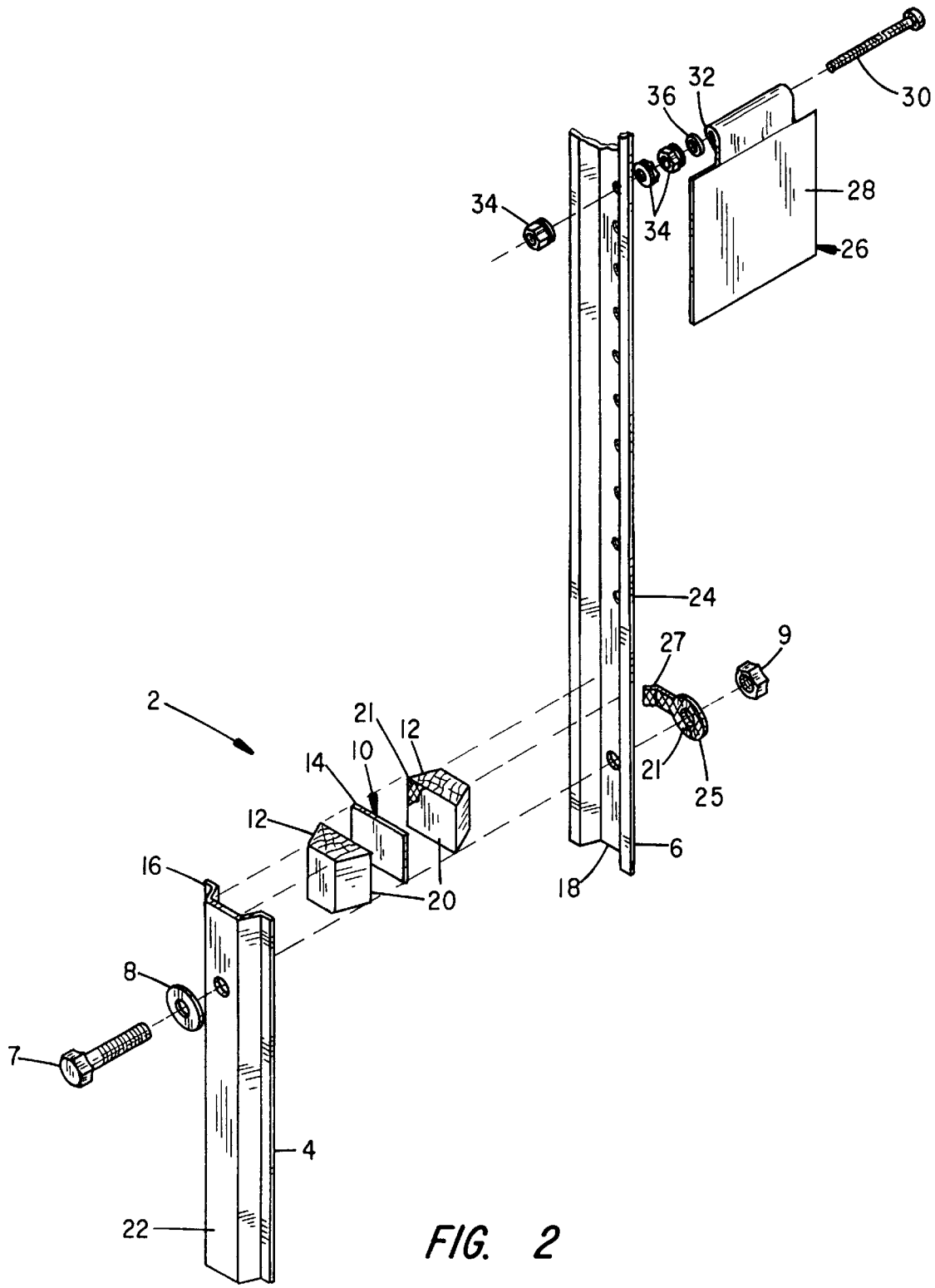
FIG. 2 is a perceptive view shown in exploded assembly to the signpost, collapsible joint and rotating, reflective delineator or marker.

Referring to FIGS. 1 and 2, views are shown to an improved signpost 2 of the invention. The signpost 2 includes a ground stake 4 and a sign stake 6. The ground stake 4 is typically 18 to 36 inches long and is set into the ground. The ground stake 4 is secured to the stake 6 at a pivot bolt 7, washers 8, nut 9 and a collapsible joint assembly 10. Normally the top of the ground stake 4 is set low to the ground such that the stake 6 can rotate and pass beneath a snowplow blade.

The joint assembly 10 includes a pair of hardwood blocks 12 and an intervening member or section of compressible material 14, such as a piece of tarpaper. The blocks 12 mount to vertical channels 16 and 18 at the stakes 4 and 6. The material is positioned to align with a vertical shear plane 19 between the stakes 4 and 6. The material 14 provides friction to grip opposing surfaces 20 of the blocks 12 in the vertical shear plane 19 and retain the sign stake 6 upright through normal wind loads and other environmental conditions.

The surface area of the joint 10 and material 14 is selected such that the joint 10 will fail under lateral load forces in excess of predetermined normal support force and less than that required to bend the stake 6. The amount of force necessary to overcome the joint 10 will vary depending upon normal environmental conditions and the construction and materials used to fabricate the stakes 4 and 6. Joint failure occurs when the sign stake 6 rotates.

The length of the stakes 4 and 6 can be adjusted. The lengths of the blocks 12 and area of the mating surfaces 20 may also be adjusted as desired. Although a tarpaper material 14 is presently preferred, other materials 14 can be used that exhibit a high coefficient of friction relative to the blocks 12, such as rubber or sandpaper. An adhesive might also be used. The surfaces 20 may also include knurling, checkering or other surface imperfections 21 that enhance the gripping at the joint 10.

Although the stakes 4 and 6 are mounted to face each other at the channels 16 and 18, the opposite, raised surfaces 22 and 24 could be mounted in facing relation to each other between a section of material 14. The metal surfaces 22 and 24, however, are felt to be more susceptible to premature slippage relative to the material 14 versus the blocks 12. In this instance, an interface member having a flange that interlocks with the stakes 4 and/or 6 and that is designed to shear or bend at a predetermined load might also be secured between the stakes 4 and 6. For example, a washer 25 having a flange 27 that mounts in a hole or about the edges of the stakes 4 and/or 6 might be used at the pivot axle 7 instead of a piece of tarpaper 14.

Mounted to the sign stake 6 is a reflective delineator or marker 26. The marker 26 can be cut to any desired shape. A reflective material 28 is secured to one or both surfaces that are exposed to oncoming traffic. The marker 26 rotates about an axle bolt 30 that is fitted through a sleeve 32. The axle bolt 30 can be secured at various heights along the stake 6. The length of the axle bolt 30 and/or positioning of lock nuts 34 and washers 36 can be adjusted to vary the lateral displacement of the marker 26 from the stake 6.

Figure 3:
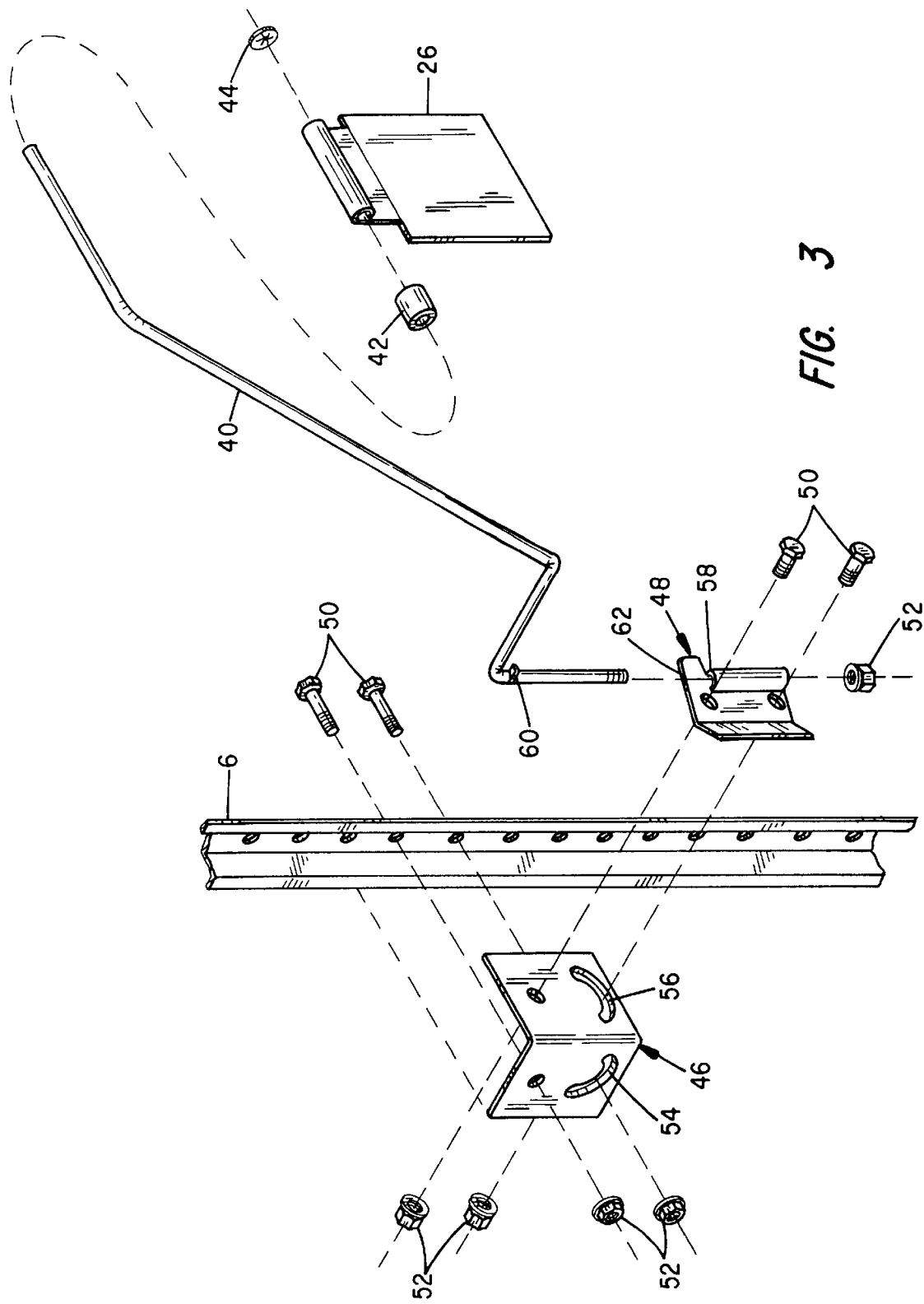
FIG. 3 is a perspective view shown in exploded assembly to another rotating delineator that is supported from a rotating arm.

FIG. 3 depicts another arrangement of the marker 26 at the sign stake 6. The marker 26 is secured to an extension arm 40 between a bushing 42 and end fastener 44 to rotate on the arm 40. The arm 40 is separately secured to a pair of brackets 46 and 48 that permit a rotational adjustment of the arm 40. The bracket 46 is secured to the sign stake 6 with bolts 50 and nuts 52. The bracket 46 can rotate about a lower bolt 50 at a slot 54.

The bracket 48 is secured to the bracket 46 with other bolts and nuts 50 and 52 and the bracket 48 can separately rotate at a slot 56. The arm 40 is supported to a sleeve 58 formed at the side of the bracket 48 and freely rotates within the sleeve 58. The range of rotation of the arm 40 is limited by a shoulder or projection 60 at the arm 40 that cooperates with a tang 62 at the bracket 48.

The arm 40 laterally offsets the marker 26 from the sign stake 6 to make it more visible. That is, the marker 26 is positioned closer to the roadway edge. The slots 54 and 56 and sleeve 58 facilitate the adjustment of the arm 40. The arm 40 and stake 6 can thus both pivot in the event of separately being struck by a snow plow or windrow of plowed material to minimize damage.

While the invention has been described with respect to a preferred construction and considered improvements or alternatives thereto, still other constructions may be suggested to those skilled in the art. For example, the collapsible signpost 2 can be used alone or in various combinations with either or both of the offset markers 26 of FIG. 2 and/or FIG. 3. Other conventional signs or delineator markers may also be secured to the signpost 2. The foregoing description should therefore be construed to include all those embodiments within the spirit and scope of the following claims.

What is claimed is:

1. A signpost, comprising:
    a) first and second stakes, wherein the first stake is relatively shorter than the second stake and mounts in the ground and wherein said second stake is mounted to pivot relative to said first stake;
    b) joint means for restraining said second stake to said first stake and including first and second blocks mounted in channels of said first and second stakes and separated by a compressible member and further including a pivot axle that extends through said first and second stakes whereby rotation of said second stake is constrained to a shear plane containing said compressible member upon said second stake encountering a force greater than a nominal support force; and
    c) a sign marker secured to said second stake.

2. A signpost as set forth in claim 1 wherein said compressible member is selected from a class of materials including tarpaper, rubber or sandpaper.

3. A signpost as set forth in claim 1 wherein a pivot axle extends from the second stake and wherein said sign marker is secured at a sleeve to rotate about the pivot axle.

4. A signpost as set forth in claim 3 wherein the sign marker includes a surface covered with a reflective material.

5. A signpost as set forth in claim 3 wherein the marker is secured to an arm that rotates at a sleeve of a first bracket and wherein the first bracket is secured to a second bracket that is mounted to the second stake.

6. A signpost as set forth in claim 5 wherein said first and second brackets each include slots and the first and second brackets are secured such that the first and second brackets can rotate relative to each other and to the second stake over a range limited by the slots.

7. A signpost as set forth in claim 1 wherein at least one of the surfaces of said first and second blocks contacting said compressible member is knurled.

8. A signpost as set forth in claim 1 wherein said channels extend the full length of said first and second stakes.

9. A signpost as set forth in claim 1 wherein said pivot axle comprises fastener means for compressing said first and second stakes, said first and second blocks and said compressible member together to support said first and second stakes.

10. A signpost, comprising:
    a) first and second stakes, wherein the first stake is relatively shorter than the second stake and mounts in the ground and the second stake is secured upright to the first stake; and
    b) first and second blocks mounted to channels at the first and second stakes to present flat adjoining surfaces and wherein a piece of tarpaper is secured between the flat adjoining surfaces, whereby the second stake is able to rotate relative to the first stake in the plane containing the tarpaper without bending if struck by a force larger than a predetermined force; and
    c) a sign marker secured to said sign post.

11. A signpost as set forth in claim 10 wherein a pivot axle extends from the second stake and supports the sign marker at a sleeve to rotate about the pivot axle.

12. A signpost as set forth in claim 11 including a second sign marker secured to an arm that rotates at a sleeve of a first bracket and wherein the first bracket is secured to a second bracket that is mounted to the second stake.

13. A signpost as set forth in claim 12 wherein said first and second brackets each include slots and the first and second brackets are secured such that the first and second brackets can rotate relative to each other and to the second stake over a range limited by the slots.

14. A signpost as set forth in claim 10 wherein the adjoining surfaces of said blocks are knurled.

15. A signpost, comprising:
    a) a ground stake and a sign stake, wherein the ground stake is relatively shorter than the sign stake, and wherein said sign stake is mounted to pivot relative to said ground stake; and b) first and second blocks mounted in adjacent channels on said ground and sign stakes to present flat adjoining surfaces and wherein a compressible member is secured between the flat adjoining surfaces and further including a pivot axle that extends through said ground and sign stakes, whereby rotation of said sign stake is constrained to a shear plane containing said compressible member upon said sign stake encountering a force greater than a nominal support force.

16. A signpost as set forth in claim 15 wherein said pivot axle comprises a fastener and wherein said fastener compresses said ground and sign stakes, said first and second blocks and said compressible member together to support said ground and sign stakes.

* * * * *